July 8, 1930.  A. KOLKO  1,769,925
CARBURETING APPARATUS
Filed May 5, 1924   2 Sheets-Sheet 2
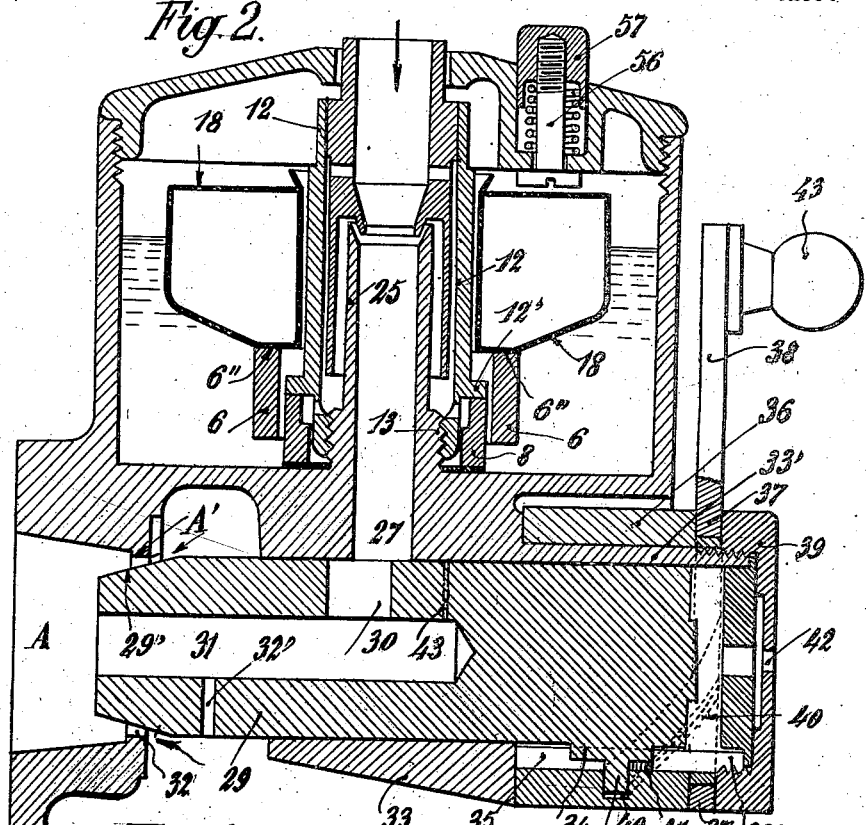
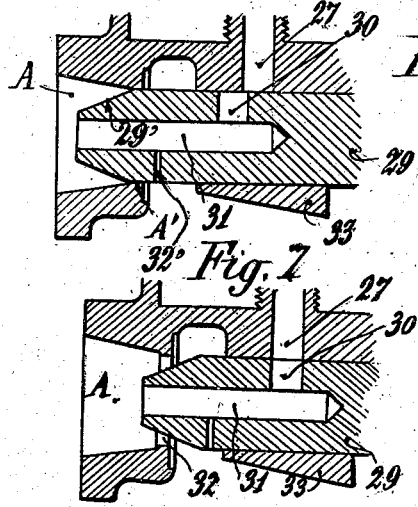
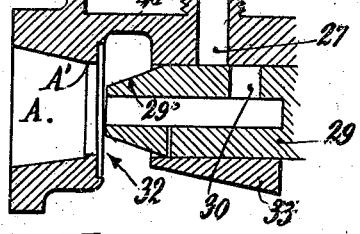
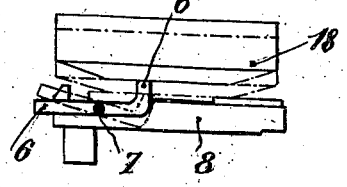

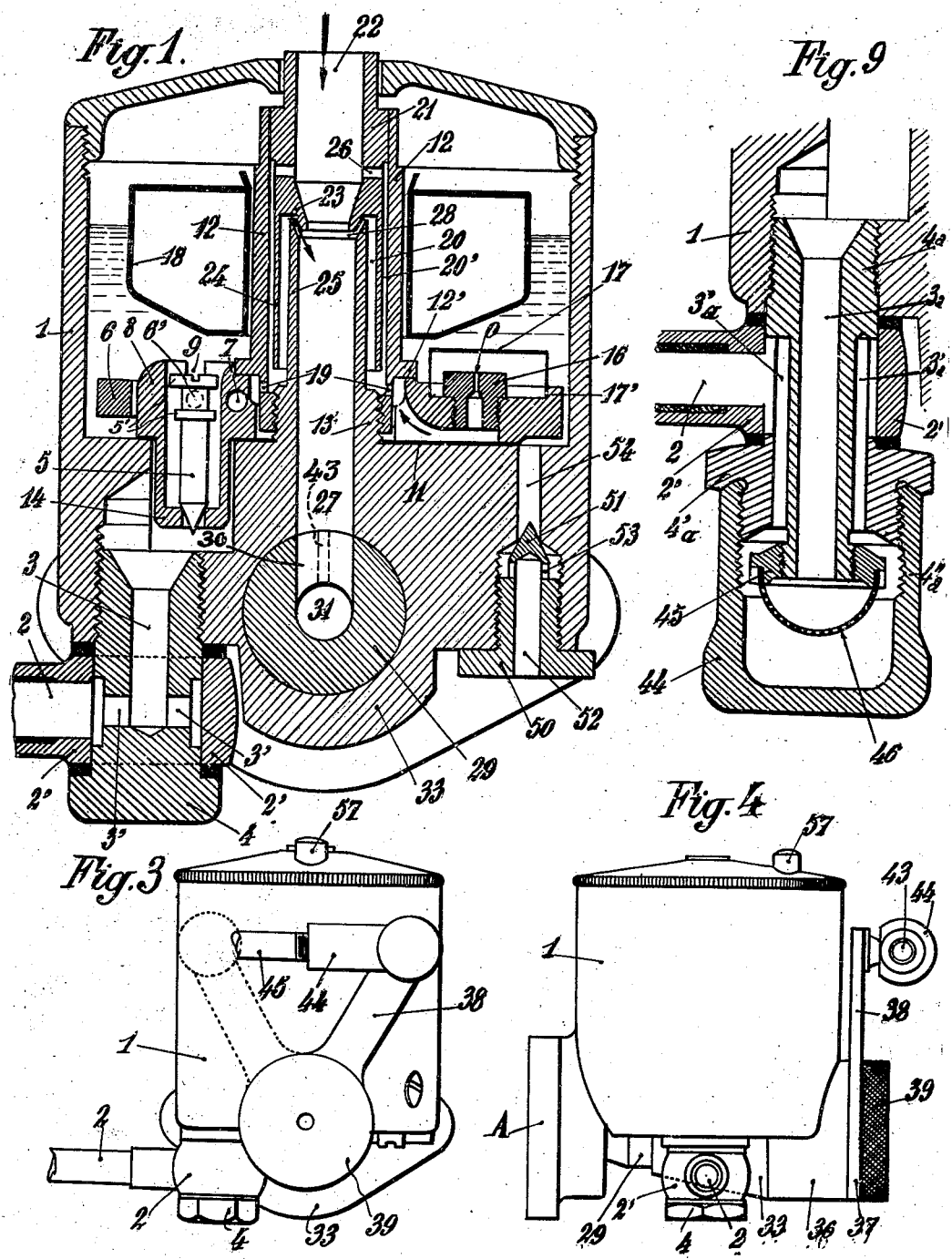

Patented July 8, 1930

1,769,925

UNITED STATES PATENT OFFICE

ARON KOLKO, OF COLOMBES, FRANCE

CARBURETING APPARATUS

Application filed May 5, 1924, Serial No. 711,140, and in France May 12, 1923.

The invention has for its object a carburetter whose operation from the extreme slow speed to the running on the maximum fuel inlet, is ensured by a single sprayer, means being however provided whereby the fuel can be made richer or poorer in a momentary manner according to the running of the engine. The said carburetter provides for the formation of a rich mixture whose composition is constant when in regular working, but which becomes richer upon starting and upon resumption of speed, and to which air is subsequently added by a regulating element or slide valve, the action being made automatic by the fact that the flow section of the air regulated by a slide valve is in a constant proportion, according to a well-determined law, to the flow section of the rich mixture which is also regulated by the same valve.

The invention relates chiefly to the arrangement of means employed to form the rich mixture, as well as to the arrangement of the slide valve ensuring the proportionality according to any desired law between the rich mixture and the quantity of air to be added thereto. The invention further relates to certain details of construction and chiefly a control for the needle valve and an arrangement of sprayer such that the float can be removed for the inspection of the apparatus when the engine is running; an arrangement of the control placed outside the apparatus and in its plane of symmetry in order that the control may be moved in all directions; a filter plug adapted for mounting upon the petrol inlet without modification of the latter or the main body of the carburetter.
The appended drawing shows solely by way of example an embodiment of the invention.

Fig. 1 is a vertical axial section through the petrol inlet and the needle valve; Fig. 2 is an axial section at 90° from the preceding. Figs. 3 and 4 are elevational views on a smaller scale corresponding respectively to Figs. 1 and 2. Fig. 5 is an external view of the support of the swinging lever, the needle valve and the float, showing the operation of the float. Figs. 6, 7 and 8 are diagrammatic views showing three different positions of the regulating slide valve. Fig. 9 is a detail on the same scale as Fig. 1 showing, as a modification, a filter plug which may replace the usual plug.

In Figs. 1 to 8, the carburetter consists of a main body 1 forming a float chamber into which the petrol is admitted through the inlet conduit 2 and the passages 3' and 3 of a screwthreaded plug 4 whose head presses against the socket-shaped part 2' of the inlet conduit 2; the petrol passes thence into the chamber through the automatic needle valve 5. The said valve is controlled by a swinging lever 6 (Figs. 1, 2 and 5) which is pivoted at 7 to a support 8. Two projections 6" extend laterally from the lever 6 and pass freely through a slot 9 in the member 8 so as to engage between the flanges 5' of the needle valve 5. The member 8 rests on a packing 11 on the bottom of the float chamber, against which it is held by the flange 12' of a tube 12 screwed on a threaded boss 13 of the body 1. The member 8 has within it an extension which forms a seat 14 for the valve 5, and also carries a removable plug or the like 16 having a calibrated orifice, through which passes the fuel from the float chamber to the spray jet system. A small filter 17 covering the orifice $o$ may be sprung between walls 17' formed on the member 8.

The float 18 surrounds the tube 12 which serves to guide the same and as shown in Figs. 2 and 5 it rests on either side of the tube 12 upon the ends 6" of two lateral arms of the forked lever 6; if the float is raised by the pressure of the liquid in the chamber by is momentarily removed, the lever 6 descends by its own weight to close the valve into the position shown in full lines in Figure 5. If, however, the level of the liquid in the float chamber falls, the float descends and bears against the ends 6" of the lever which opens the valve as shown in broken lines in Figure 5.

This control of the needle valve with a float acting contrary to the usual direction, and this arrangement of the member with calibrated orifice $o$, offer the following advantages: The float need not be necessarily lighter than the liquid, and it may consist of a heavier body which will not float, provided one equilibrates the whole combination in the proper manner by the opposed weight formed by the lever 6 so that the float shall not act by its own weight to lift the said lever except when it is out of the liquid to a certain extent. The float may be removed even while the engine is running without closing the petrol inlet cock, since this admission is automatically cut off by the needle valve if the float does not act by its weight. Consequently, when running, one may inspect the needle valve, clean the filter 17, and inspect or clean out the sprayer o, as desired.

The liquid whose level is thus made constant by the operation of the needle valve will pass through the filter 17 and the calibrated orifice o of the sprayer 16 and will arrive—following the path shown by the arrow and passing through the multiple holes in the tube 12—within the double annular chamber 20, 20' which is constituted as follows. Within the tube 12 is secured, for instance by soldering, a tube 21 whose outer part 22 is open to the atmosphere and whose lower part 23 forms a convergent nozzle; the said tube has below the nozzle 23 an extension 24 forming a baffle between the tube 12 and a tubular extension 25 of the base 13 of the carburetter body; between 12 and 24 the chamber 20' is connected through the orifices 26 with a region having a low vacuum in the rear of the nozzle 23; between 24 and 25 the chamber 20 is connected with the suction passage 27 through the space 28 between the end of 25 and the outer part of the nozzle 23, this space forming an annular convergent nozzle 28. The chambers 20 and 20' thus form communicating vessels which are supplied through the orifices 19 and deliver petrol through the annular convergent nozzle 28. This arrangement of communicating vessels provides for an automatic variation of the pressure of the liquid supplying the nozzle 28 under the effect of variations in the engine suction; by a suitable choice of the capacity of the outer annular space 20', one obtains automatically the supply of the amounts of fuel needed when starting and slowing up, and the mixture can also be made poorer if on the contrary the gas throttle is closed.

The liquid which streams from the nozzle 28 due to the suction will be mingled with the air admitted through 28 and through the nozzle 23, thus forming a rich mixture which passes through 27 to the regulating element.

The said regulating element consists of a cylindrical slide valve 29 movable on its axis perpendicularly to the axis of the vessel; the said valve is provided with a port 30 cooperating with a passage 27 whereby the same is connected with the axial passage 31 of the slide valve; the end of the latter communicates with the conduit A which serves to connect the device with the suction conduit of the engine. The outer surface of the slide valve 29 has the form of a cone, or of a suitable curve 29', and it cooperates with the inlet portion A' of the suction coupling portion A in order to regulate the air at the annular orifice 32. The relative positions of the port 30 and the passage 27, and also of the portion 29' and the portion A', as well as the profile of this portion 29' are such that the relation between the quantity of air entering through 32 to the quantity of the rich mixture passing through 30 shall follow a predetermined law such as may be desired, according to the axial position of the valve 29. It thus becomes a very easy matter to provide a number of interchangeable slide valves 29 so constructed as to correspond to any desired law of the variation of the proportion, each valve being numbered according to its characteristics.

The slide valve 29 slides in a socket 33 formed by the body of the carburetter, and is guided by a stud 34 in a slot 35 whose width corresponds to the tubular extension 33' of the socket 33, so that it can only move lengthwise without rotating. On the extension 33' is revoluble a sleeve 36 which is keyed to the ferrule 37 of an operating arm 38; the sleeve 36 is held in place by the screwing of a plug 39 on the screwthreaded end of the extension 33' of the socket 33; the sleeve 36 has in the interior a helical groove 40 in which is engaged a projection of like shape 41 of the slide valve 29. By rotating the arm 38, and with it the sleeve 36, the valve 29 will be given an axial movement. An orifice for the inlet and outlet of air is provided in the plug 39 in order to avoid vacuum or compression. The operating arm 38 is provided with a spherical head 43 forming the ball of a bearing, in order to make a variably-movable connection, through the intermediary of the member 44, with the control rod 45.

Due to the disposition of the slide valve in the plane of symmetry of the apparatus and perpendicular to the axis of the float chamber, with the control end outside the apparatus and with the ball joint coupling, the carburetter control can be turned about in all directions either by modifying the keyed position of the ferrule 37 of the control arm 38 with respect to the sleeve 36 (which is effected by a simple pin) or by changing the sleeve 36 and the slide valve in order to change the direction of progression of the helical groove.

Figs. 6, 7 and 8 show three different positions of the slide valve. In Fig. 6, the said valve is in the position for reducing the flow of air between A' and 29, its shape being such as to admit to the engine only the small amount of rich mixture passing through the uncovered flow section of the port 30, to which is also added a small amount of air, in the exact proportion, which passes through the small calibrated hole 32' provided for the purpose in the slide valve. Fig. 7 shows the position for the normal running, the rich mixture now passing through the whole section of the port 30 and the air passing through the section 30 calculated to this effect. One may further draw-back the valve 30, as shown in Fig. 8; the port 30 will be again closed, whilst the flow section for the air is now augmented; this provides for the braking by means of the engine, since one thus admits into the latter non-carburetted air which affords an ample supply to the cylinder and produces only a negative work of compression. The position of maximum opening (Fig. 7) is preferably made evident to the driver by providing, for the accelerator handle, a flexible tappet which is encountered by the handle and is thus compressed as soon as the device has passed beyond the full load position (Fig. 7) towards the braking position (Fig. 8).

In certain engines which have become worn and are thus subject to infiltration of air, it may prove useful in order to provide for proper working at slow speed, to admit a certain quantity of carburetted mixture in addition to the theoretically exact amount for an engine without such leakage. This desideratum is had in a very simple manner by piercing in the slide valve 29—back of the port 30 for instance as shown by the mixed line in Fig. 2—a small orifice 43 which is opened only in the starting position but which will be closed when passing beyond the slow-speed position.

50 is an emptying plug for the vessel, whose novel character consists in the fact that it ends in a needle-valve 51 and that it is provided with an axial duct 52 and with the lateral orifice 53 so that the vessel can be emptied through 54 by slightly unscrewing the plug 50 but without removing it.

The cover of the petrol chamber is provided with a spring-mounted rod 56 which can be pushed down by the button 57, thus bearing upon the float in order to open the needle valve.

Fig. 9 shows a filter plug which is constructed in such manner as to replace the plug 4 without any change in the petrol inlet conduit or in the body of the carburetter.

2 indicates as before the petrol inlet conduit having a flanged end 2' which is pressed against a corresponding surface on the body 1 of the carburetter—packing washers being interposed—by the hexagonal head 4'$_a$ of the plug 4$_a$ screwing into the same tapped hole in the carburetter body as the hole 4 of Fig. 1. But the axial duct 3$_a$ of said plug is herein extended to a lower point than the head 4'$_a$ and communicates with the petrol inlet through the outer longitudinal ducts 3'$_a$, along one of the paths shown by the arrow; the closing being effected at the lower part by the hollow plug 44; below the head 4'$_a$ the said plug comprises a tapped extension 4''$_a$ in which is mounted a strainer 46. It is observed that the said filter plug, which consists exclusively of machined pieces and is interchangeable with the usual plug without requiring any change in the known piping, will provide a methodical circulation for the petrol, for in fact the impurities will be deposited at the outside of the filter, either in the chamber 44 or upon the outer surface of the filter, and the several parts can readily be inspected by removing the hollow plug 44. The said filter plug can be used with any other type of carburetter than the one described.

Obviously, the various dispositions and details of construction herein described and illustrated may be modified without departing from the spirit of the invention.

Claims:

1. A carburettor comprising in combination means to form a rich fuel and air mixture and to control an additional main air inlet, a passage to lead said mixture towards the choke valve of said carburettor, a hollow slide choke valve movable transversally to said conduit and communicating with said conduit by a port varying according to the positions of said valve and with the suction conduit of an engine by an unvarying port, said hollow slide valve having one of its ends provided for entrance into the suction conduit and for cooperating with the same to control the additional main air inlet.

2. A carburettor comprising in combination means to form a rich fuel and air mixture and to control an additional main air inlet, a passage to lead said mixture toward the choke valve of said carburettor, a hollow slide choke valve movable transversely to said passage, a radial orifice of small diameter in said valve for admitting fuel mixture to an engine suction conduit in the starting position of the choke valve, a second radial orifice of proportionally larger diameter in the choke valve for admitting fuel mixture to the engine suction conduit in the normal running position of the choke valve, and an axial orifice in said hollow slide valve communicating with the engine suction conduit, said hollow slide valve having one of the ends thereof adapted for entrance into the suction conduit and for cooperating with the same to control the additional main air inlet.

3. A carburettor comprising in combination a fuel chamber, a mixing chamber communicating with said fuel chamber, at least one tube forming a baffle in said mixing chamber, a main air inlet having a convergent nozzle opening into said mixing chamber, an annular opening for the fuel inlet into said mixing chamber, radial ports in said main air inlet disposed at the rear of said nozzle and communicating with the annular fuel inlet into said mixing chamber, a passage to lead the rich fuel mixture formed toward the choke valve of said carburettor, a hollow slide choke valve movable transversely to said passage and communicating with said passage by a port varying accordingly to the positions of said valve and with the suction conduit of an engine by an unvarying port, said hollow slide valve having one of the ends thereof adapted for entrance into the suction conduit and for cooperating with the same to control an additional main air inlet.

4. A carburettor comprising in combination means to form a rich fuel and air mixture and to control an additional main air inlet, a passage to lead said mixture toward the choke valve of said carburettor, a hollow slide valve movable transversely to said passage and having one end thereof adapted for entrance into the suction conduit of an engine and for cooperating with the same to control the additional main air inlet, an axial orifice in said hollow slide valve communicating with said suction conduit, a radial orifice in said valve for putting said axial orifice in communication with the aforesaid fuel mixture lead passage which communication is broken owing to the position of the radial orifice when the choke valve is withdrawn to admit maximum additional main air to the engine suction conduit.

5. A carburettor comprising in combination means to form a rich fuel and air mixture and to control an additional main air inlet, a passage to lead said mixture towards the choke valve of said carburettor; a hollow slide choke valve movable transversally to said passage; a radial orifice of small diameter in said valve for admitting fuel mixture to an engine suction conduit in the starting position of the choke valve, a second radial orifice of proportionately larger diameter in the choke valve for admitting fuel mixture to the engine suction conduit in the normal running position of the choke valve, both said radial orifices being positioned so that when the choke valve is withdrawn to admit maximum main additional air to the engine suction conduit the feed of fuel mixture to said conduit is shut off; and an axial orifice in said hollow slide valve communicating with the engine suction conduit and with said radial orifices, said hollow slide valve having one of its ends provided for entrance into the suction conduit and for cooperating with the same to control the additional main air inlet.

In testimony whereof I have hereunto set my hand.

ARON KOLKO.